United States Patent [19]

Hodska

[11] 3,968,262
[45] July 6, 1976

[54] COMBINED CONFECTION AND BUBBLE-FORMING DEVICE

[75] Inventor: Nicholas S. Hodska, Stratford, Conn.

[73] Assignee: Lawrence Peska Associates, Inc., New York, N.Y. ; a part interest

[22] Filed: Apr. 11, 1975

[21] Appl. No.: 567,061

Related U.S. Application Data

[63] Continuation-in-part of Ser. No. 473,348, May 28, 1974, abandoned.

[52] U.S. Cl. .................................. 426/134; 46/6; D1/22; D34/15 H
[51] Int. Cl.² .................. A23G 3/00; A23G 9/00; A63H 33/28
[58] Field of Search ................ 46/6, 7, 8; 426/91, 426/104, 134, 110; D34/15 H

[56] References Cited
UNITED STATES PATENTS

| | | | |
|---|---|---|---|
| 1,548,970 | 8/1925 | York | 426/134 |
| 2,396,433 | 3/1946 | Pimblett | 46/6 |
| 2,514,009 | 7/1950 | Raspet | 46/6 |
| 2,617,324 | 11/1952 | Brody | 426/134 X |
| 2,821,481 | 11/1958 | Moslo | 426/134 |
| 3,108,394 | 10/1963 | Ellman et al. | 46/7 |
| 3,109,255 | 11/1963 | Hein | 46/7 |
| 3,140,954 | 7/1964 | Schroeder | 426/134 X |
| 3,663,717 | 5/1972 | Coster | 426/134 |
| D192,225 | 2/1962 | Coleman | 426/134 |

*Primary Examiner*—Steven L. Weinstein
*Attorney, Agent, or Firm*—Jack D. Slobod

[57] ABSTRACT

This disclosure is directed to improved plastic shaped supports for an edible member such as ice cream or candy. The support or stick has an elongated slit therein which improves adherence of the member to the support and a rounded top with a circular opening which can be used for blowing bubbles after the edible member has been consumed. An array of apertures is provided surrounding the circular opening, and radially directed channels communicating between the apertures and the circular opening provide surfaces for the adherence of bubble solution. The various apertures have a total area of at least one half square inch.

3 Claims, 6 Drawing Figures

COMBINED CONFECTION AND BUBBLE-FORMING DEVICE

BACKGROUND OF THE INVENTION

This application is a continuation-in-part of my application, Ser. No. 473,348, filed May 28, 1974 and now abandoned.

The present invention relates generally to an elongated support or stick for mounting a comestible confection such as ice cream and candy which serves as a handle to aid in consuming the comestible. In its particular aspects, the invention relates to a circular apertured head on the support within the comestible which provides for locking the comestible on the support as well as serving as a bubble forming device after consumption of the comestible.

Generally smooth sticks have been used in the prior art for supporting a comestible such as ice cream and candy. Such smooth sticks do not provide adequate adherence of the comestible particularly in the case of ice cream as it softens.

Various supports for comestibles have been provided which serve as toys after the comestible is consumed. Illustrative in this regard are U.S. Pat. No. 2,469,589 to Barricini, U.S. Pat. No. 2,821,481 to Moslo and U.S. Pat. No. 3,663,717 to Coster. While the supports disclosed in the aforementioned patents provide some measure of locking of the comestible thereon they do not provide adequate adherence to prevent a comestible such as ice cream from slipping off the support as it softens.

OBJECTS OF THE INVENTION

It is an object of the present invention to provide a support for a comestible which will prevent the comestible from slipping off the support.

It is a further object of the present invention to provide a support for a comestible which will serve as a toy once the comestible is consumed.

SUMMARY OF THE INVENTION

Briefly, the aforementioned and other objects of the present invention are satisfied by the realization that the provision of large area apertures in excess of ½ square inch open area in a support permit large sections of the comestible to be formed and trapped in the apertures to lock the body of the comestible on the support. In accordance with this realization, the support is configured with a circular head having a central hole greater in diameter than the width of the support. The head permits the support to serve as a bubble forming member once the comestible is consumed. To provide further locking area, a large elongated longitudinally directed aperture is provided on a stem portion of the support. The combined open area of the hole and the aperture exceeds one half of a square inch to permit sufficient ice cream to form therethrough of an adequate shear strength.

Further interlocking is provided by a circular array of apertures in the head and radially directed channels leading from the apertures to the central hole. The aperture array channels also provide traps for the adherence of soap solution to aid in the use of the support as a bubble forming device.

Other objects, features and advantages of the present invention will become apparent upon perusal of the following detailed description thereof when taken in conjunction with the appended drawing wherein.

DETAILED DESCRIPTION

Figure 1:
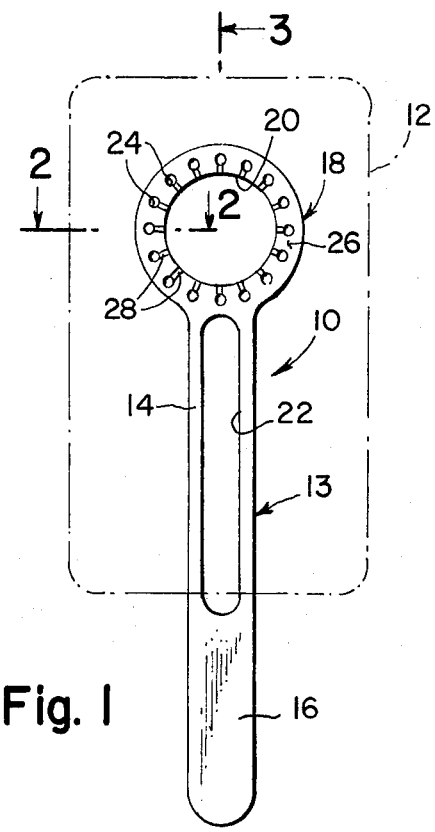
FIG. 1 is a front view of the support of the present invention in a comestible cake.

With reference to FIGS. 1 through 4 of the drawing, there is illustrated a support 10 for an edible member 12 such as a cake or ice cream or other confection. Support 10 comprises an elongated stem 13 of substantially constant thickness and width comprising a portion 14 of its length within confection 12 and a portion 16 of its length outside of confection 12 which serves as a handle. The support 10 further includes a generally circular head 18 on the end of stem portion 14 having a diameter at least two times as large as the transverse dimensions such as the width of portion 14 and having the same general thickness as stem 13. The circular head 18, is provided with a large central hole 20, also larger in diameter than the width of strip portion 14. Hole 20 is preferably ¾ inch in diameter (0.44 square inches in diameter). Head 18, with hole 20, serves as a member for forming soap bubbles 21 by dipping head 18 into a soap solution once confection 12 is consumed.

When head 18 is within confection 12, it serves to rigidly lock the confection in place on the support 10. Even when confection 12 is softening ice cream, the portion of the confection which is located within hole 18 provides a large area mass of sufficient shear strength to lock the ice cream on the support. The outside diameter of head 18, being larger than the width of stem 13 provides further locking action.

To augment the locking action of head 18 and hole 20, there is formed in stem portion 14 an elongated longitudinally directed slot aperture 22. Slot aperture 22 in its shorter dimension spans the majority of the width of stem 13 and in its longer dimension spans the majority of the length of stem 13 to permit another large area mass of confection 12 to be formed therein. Preferably slot aperture 22 is at least 0.18 square inches in open area so that the combination of hole 20 and aperture 22 exceeds 0.5 square inches of open area which is considered to be a critical open area for ice cream to provide sufficient shear strength.

Primarily to aid in adherence of soap solution to support 10 when it is used as bubble forming device, and also to provide additional locking action, a circular array of small apertures 24 are formed in the annular wall 26 of head 18 angularly spaced apart around hole 20. A separate channel 28 is provided radially directed from each aperture 24 to central hole 20 for feeding any soap solution collected in apertures 24 to hole 18 by a wicking effect.

Figure 2A:
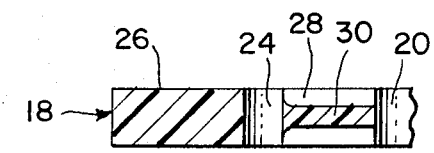
FIGS. 2A and 2B are partial cross-sectional views of alternate embodiments taken along the lines 2—2 in FIG. 1.
Figure 2B:
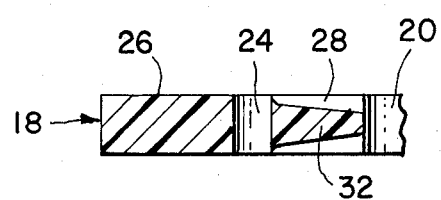
Figures 3, 4:
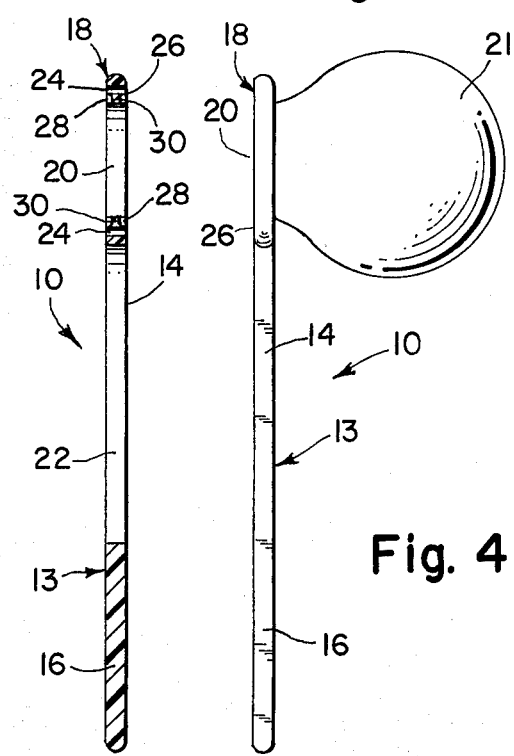
FIG. 3 is a cross-sectional side view taken along the lines 3—3 in FIG. 1.
FIG. 4 is a side view of the support of FIG. 1 but depicting the use of the support after the comestible is consumed.

As shown in FIG. 2A, channels 28 comprise elongated radially directed grooves in the front and back annular walls 26 leaving a web 30 of reduced substantially constant thickness between aperture 24 and hole 18. Preferably web 30 is one third the general thickness of head 18. Alternatively as shown in FIG. 2B, the raidally directed grooves forming each channel 28 may be tapered radially in depth, leaving a radially tapered web 32 having the same thickness as head 18 at apertures 24 and having the reduced thickness of web 30 at hole 20. The tapering of channels 28 in depth towards hole 20 permits apertures 24 to hold more soap solution and aids in the wicking effect of the channel 28. As should be apparent the provision of apertures 24 and channels 28 provide irregularities in the thickness of head 18, and thereby permit the confection 12 to be locked in place about these irregularities.

The support 10 is preferably molded of plastic such as polystyrene or vinyl acetate. Preferably, the supports 10 should be provided in various solid colors, the color of the support being indicative of the flavor of the confection or ice cream 12.

Figure 5:
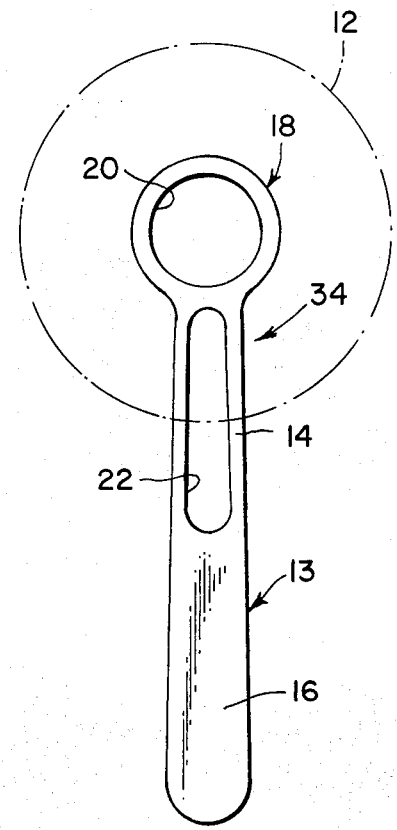
FIG. 5 is a front view similar to FIG. 1 but of an alternate embodiment.

Many modifications of the support 10 are possible. For example, as illustrated in FIG. 5 an alternate embodiment support 34 may be formed by providing stem 13 as tapered in width so that handle portion 16 is of a width greater than portion 14. Furthermore, confection 12 instead of being of the rectangular shape characteristic of ice cream can be of other shapes such as circular which is characteristic of hard candy.

Having described in detail the preferred embodiment of the present invention along with some alternative concepts, it should be apparent that numerous modifications, additions and omissions in the details described are possible within the spirit and scope of the invention. Accordingly, the following claims define the invention.

What is claimed is:

1. In combination with a body of edible material, a support comprising: a generally planar annular head within said body, said head being characterized by generally circular outside and inside diameters, said inside diameter defining a central opening through said head thereby permitting the support to serve as a bubble forming member for use with a soap solution once said body is consumed, an elongated stem extending radially from said head, said stem including a first portion lying outside of said body serving as a handle, an array of apertures through said head at angularly spaced apart positions intermediate said inside and outside diameters for storing said soap solution; and plural radially directed angularly spaced apart grooves in the surface of said head communicating between the apertures and the central opening for conveying said soap solution to said central opening, said body of edible material extending into said central opening and into said apertures for locking said body on said support.

2. The combinatin of claim 1 wherein said grooves in said head taper in depth from a relatively large depth at said central opening to a relatively small depth at said apertures.

3. The combinatin of claim 1 wherein said stem includes a second portion lying within said body, and a slot through said second portion into which said body extends for further locking said body on said support.

* * * * *